Jan. 21, 1930.　　　E. A. SUTHERLAND　　　1,744,590
PRESSURE GAUGE
Filed Aug. 31, 1928
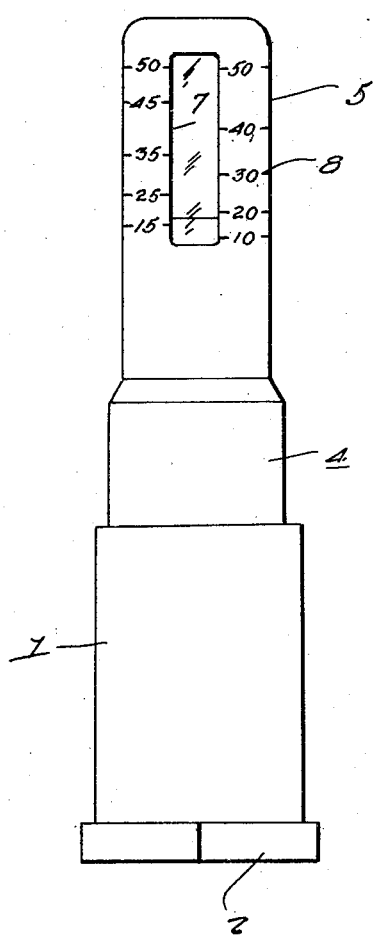
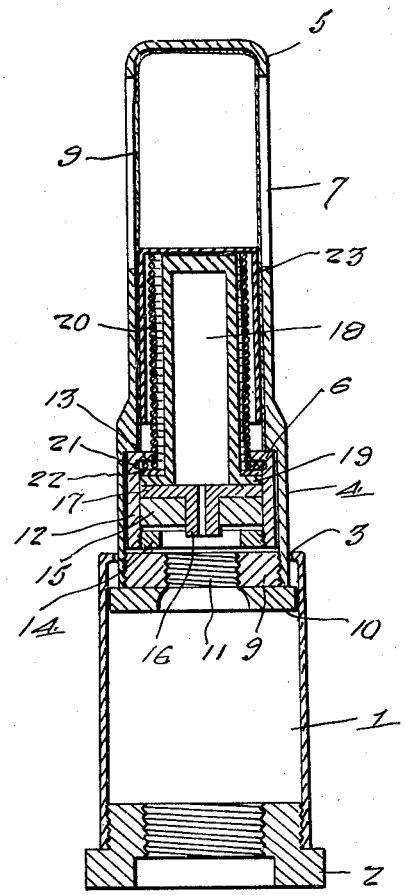
Inventor
E. A. Sutherland
By Clarence A. O'Brien
Attorney Patented Jan. 21, 1930

1,744,590

UNITED STATES PATENT OFFICE

ELIJAH A. SUTHERLAND, OF CARIBOU, MAINE

PRESSURE GAUGE

Application filed August 31, 1928. Serial No. 303,271.

The present invention relates to improvements in pressure gauges for use in conjunction with conventional inflating valves of pneumatic tire inner tube and has reference more particularly to certain improvements over the pressure gauge disclosed in my prior Patent No. 1,606,674 granted November 9, 1926.

One of the important objects of the present invention is to provide a pressure gauge that includes a vertically movable indicating shell which cooperates with a rubber sack and a normally contractile coil spring for disposition within a casing having sight openings formed therein and along the edges of which openings are arranged in a predetermined manner suitable indicia indicative of different air pressures.

A further object is to provide a pressure gauge of the above mentioned character wherein the parts are so arranged as to provide an air tight fit in order to insure the proper functioning of the gauge in ascertaining the air pressure of pneumatic tires, the parts being further so constructed and arranged as to permit the same to be readily and easily assembled or disassembled whenever necessary.

Still a further object is to provide a pressure gauge of the above mentioned character which is simple in construction, inexpensive, strong and durable and further well adapted to the purposes for which it is designed.

Other objects and advantages will become apparent during the course of the following description.

In the accompanying drawing, forming a part of this specification, and in which like numerals indicate like parts throughout the same:

Figure 1 is a side elevation of my improved pressure gauge, and

Figure 2 is a longitudinal sectional view therethrough.

In the drawing wherein for the purpose of illustration is shown the preferred embodiment of my invention, the numeral 1 designates a cylindrical casing that is internally threaded at its open lower end for receiving the rim engaging nut 2, said nut being also internally threaded for engagement over the lower end portion of the threaded valve stem, not shown, that is associated with the inner tube in the usual manner.

The upper end of the cylindrical casing 1 is provided with an opening 3 through which is slidable the enlarged lower portion 4 of a cylindrical cap member 5. An annular shoulder 6 is formed within the enlarged portion 4 of this cap member as clearly shown in Figure 2 for a purpose to be presently described.

This cap member is constructed of metal and is formed with opposed pairs of longitudinally extending slots 7 that constitute sight openings and arranged on the outer face of the cap member adjacent the side edges of the respective slots are the graduations or scale marks 8 indicative of various pounds of air pressure. A lining of celluloid or other transparent material shown at 9 is arranged within the slotted portion of the cap member to exclude dust and other foreign matter from entering the cap member of the pressure gauge.

For the purpose of preventing the displacement of the cap member 5 from the upper end of the casing 1, I provide the flanged nut 9 that is threaded within the open lower end of the enlarged portion 4 of this cap member and the diameter of the flange 10 formed on the bottom of this nut is slightly less than the inner diameter of the casing 1 so as to extend beyond the edge of the opening 3 formed in the top of the casing as will be obvious from the construction shown in Figure 2.

Furthermore this nut 9 is formed with the reduced threaded opening 11 to accommodate the reduced threaded upper end of the valve stem.

Arranged within the enlarged portion 4 of the cap member 5 for disposition between the shoulder 6 and the upper face of the nut 9 is the metallic sleeve 12, the upper edge thereof being formed with an inwardly directed annular flange 13 while the lower end of this sleeve is internally threaded to accommodate an externally threaded washer 14. A rubber disk 15 is confined within the sleeve 12 and this rubber disk is formed with a central opening for accommodating the hollow valve stem engaging and depressing element 16 that depends from the metallic plate 17 and is also arranged within the sleeve 12 for rotation upon the upper face of the rubber disk 15.

The invention further comprehends the provision of a substantially cylindrical rubber sack 18 that is open at its lower end and this sack is disposed within the cap 5.

The lower end of this rubber sack extends outwardly as at 19 for engagement with the upper face of the circular metallic plate 17 in the manner as clearly shown in Figure 2.

The lower portion of the rubber sack 18 extends downwardly into the upper portion of the sleeve 12 and the flange portion 19 of the rubber sack will be disposed below the inwardly directed annular flange 13 formed on the upper end of the sleeve.

A normally contractile coil spring 20 encircles the rubber sack 18 and the lowermost convolutions of this spring are so formed as to provide a flange 21 for disposition beneath said inwardly directed flange 13 formed on the upper edge of the sleeve 12.

A metallic washer 22 encircles the rubber sack 18 and is disposed between the flanges 19 and 21 in the manner as more clearly shown in Figure 2.

The improved pressure gauge further includes the provision of a metallic indicator shell 23 that is closed at its upper end, this shell being disposed within the cap member 5 for vertical movement therein and being further positioned over the major portion of the rubber sack 18 and the coil spring 20, the upper end of the coil spring being secured to the closed upper end of the indicator shell.

The indicator shell is of a diameter less than that of the cap member 5 so as to permit the free movement of the indicator shell within the cap member when air is admitted to the bag or sack 18 and the upper face top of the indicator shell provides the means for cooperation with the graduation 8 to indicate the exact amount of air pressure in the tire.

Normally the parts are arranged as shown in the drawings and the coil spring 20 holds the indicator shell and the rubber sack in their lowermost position in the cap member 5. When the pressure gauge is secured on the valve stem, and the member 16 is caused to engage with the pin that projects from the valve stem, air will be admitted into the sack 18, the rubber disk 15 maintaining a proper seal for air tight connection so that air will not escape into the casing 1 but will be caused to escape from the inner tube directly in the rubber sack 18 and this will result in the rubber sack being expanded and simultaneously with the expansion of the rubber sack, the spring 20 will be expanded and the indicator shell 23 will move upwardly in the cap member 5 so that the exact amount of air pressure within the pneumatic tire may be readily and easily ascertained by glancing at the cap member noticing where the upper face of the top of the indicator shell registers with the graduations on the outer face of the cap member.

This will enable the operator of the vehicle to at all times know the exact amount of air which is in each of the tires. Whenever it is necessary to inflat the tire, the device may be readily and easily removed and the inner tube inflated in the usual manner.

The parts of the present pressure gauge are so constructed as to insure the positive and efficient operation of the gauge in determining the air pressures in the tires and furthermore the various elements constituting the present invention that can be readily and easily assembled or disassembled whenever necessary.

While I have shown the preferred embodiment of my invention, it is to be understood that various changes in the size, shape and arrangement of parts may be resorted to without departing from the spirit of the invention and the scope of the appended claims.

Having thus described my invention, what I claim as new is:

1. A pressure gauge comprising a cap member formed with a slot in the side thereof, the open lower end of the cap member being enlarged, means arranged within the bottom of the enlarged portion of the cap member for attachment to the reduced upper end of a conventional valve stem, a sleeve arranged within the enlarged portion of the cap member, an inwardly directed flange formed on the upper edge of said sleeve, a disk arranged within the sleeve and formed with a central opening, an apertured plate for disposition against the upper face of said disk, a rubber sack for disposition within the cap member, the open lower end of the sack extending into the sleeve, an outwardly directed flange formed on the lower end of the rubber sack for engagement with the top face of the plate, a normally contracted coil spring encircling the rubber sack, the lower end of the spring being flanged outwardly for disposition between the inwardly directed shoulder formed on the upper edge of the sleeve and the flange on the lower end of the rubber sack, an indicator shell operable within the cap member and disposed over the rubber sack and the coil spring, elements projecting downwardly from the plate around the aperture for disposition through the disk to actuate the valve in the valve stem to permit the escape of air into the rubber sack whereby said indicator shell may be actuated.

2. A pressure gauge comprising a casing open at its open end, a valve stem engaging nut arranged in the lower end of the casing, a cap member, the lower end portion thereof being enlarged and arranged for slidable movement through the upper end of the casing, said cap member being formed with a sight slot in the side thereof, a nut threaded in the open lower end of the cap member for engagement with the reduced upper end of the valve stem, a sleeve arranged within the enlarged lower end portion of the cap member, an inwardly directed flange formed on the upper edge of the sleeve, an apertured disk arranged within the sleeve, an apertured plate for disposition within the sleeve against the upper face of the disk, a rubber air sack for disposition within the cap member, the open lower end of the sack extending downwardly into the sleeve and provided with an outwardly directed flange for resting upon said plate, a normally contracted coil spring encircling the rubber air sack, an outwardly directed flange formed on the lower end of the coil spring for disposition between the inwardly directed flange on the upper edge of the sleeve and the flanged lower end of the rubber air sack, an indicator shell operable within the cap member and disposed over the rubber air sack and the coil spring, and means carried by the apertured plate for actuating the valve in the valve stem to permit the air to escape into the air sack whereby the indicator shell may be actuated.

In testimony whereof I affix my signature.

ELIJAH A. SUTHERLAND.